(12) United States Patent
Speer et al.

(10) Patent No.: US 6,254,802 B1
(45) Date of Patent: Jul. 3, 2001

(54) LOW MIGRATORY PHOTOINITIATORS FOR OXYGEN-SCAVENGING COMPOSITIONS

(75) Inventors: Drew Ve Speer; Thomas Andrew Blinka, both of Columbia; Michael Lee Becraft, Woodstock; Charles Robert Morgan, Brookeville, all of MD (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 08/857,226

(22) Filed: May 16, 1997

(51) Int. Cl.[7] ............................. C09K 15/02; C09K 15/04
(52) U.S. Cl. ................................ 252/188.28; 252/181.3; 252/186.1; 252/383; 526/90; 526/335; 206/524.2; 502/402; 502/49; 428/411.1
(58) Field of Search ........................... 252/186.1, 188.28, 252/383, 181.3; 526/90, 335; 206/524.2; 502/402, 49; 428/411.1

(56) References Cited

U.S. PATENT DOCUMENTS

| 3,759,807 | * | 9/1973 | Osborn et al. | 204/159.23 |
|---|---|---|---|---|
| 3,903,064 | * | 9/1975 | Isigami et al. | 260/DIG. 43 |
| 4,080,275 | * | 3/1978 | Photis et al. | 204/159.23 |
| 4,338,171 | * | 7/1982 | Barie, Jr. et al. | 204/159.15 |
| 5,211,875 | * | 5/1993 | Speer et al. | 252/188.28 |
| 5,310,497 | * | 5/1994 | Ve Speer et al. | 252/188.28 |
| 5,346,644 | * | 9/1994 | Speer et al. | 252/188.28 |
| 5,350,622 | * | 9/1994 | Speer et al. | 428/215 |
| 5,399,289 | * | 3/1995 | Speer et al. | 252/188.28 |
| 5,405,880 | * | 4/1995 | Kimura et al. | 523/126 |
| 5,425,896 | * | 6/1995 | Speer et al. | 252/188.28 |
| 5,498,364 | * | 3/1996 | Speer et al. | 252/188.28 |
| 5,529,833 | * | 6/1996 | Speer et al. | 428/215 |
| 5,641,425 | * | 6/1997 | McKedy et al. | 252/188.28 |
| 5,648,020 | * | 7/1997 | Speer et al. | 252/188.28 |
| 5,700,554 | * | 12/1997 | Speer et al. | 428/220 |
| 5,811,027 | * | 9/1998 | Speer et al. | 252/188.28 |

FOREIGN PATENT DOCUMENTS

| 0 822 221 A2 | 4/1998 | (EP) . |
|---|---|---|
| WO 96/29362 | 9/1996 | (WO) . |
| WO 96/33156 | 10/1996 | (WO) . |
| WO 98/05703 | 2/1998 | (WO) . |

* cited by examiner

Primary Examiner—Jill Warden
Assistant Examiner—Monique T. Cole
(74) Attorney, Agent, or Firm—Mark B. Quatt

(57) ABSTRACT

An improved composition and a method of scavenging oxygen using the composition which comprise oxidizable organic compounds, transition metal catalysts in combination with certain photoinitiators is disclosed. The method comprises initiating scavenging by exposing the composition to UV radiation. The present composition uses certain defined benzophenone derivatives which maintain effectiveness of photoinitiation while providing reduced migration of the photoinitiator from the resin matrix.

18 Claims, No Drawings

LOW MIGRATORY PHOTOINITIATORS FOR OXYGEN-SCAVENGING COMPOSITIONS

FIELD OF THE INVENTION

The invention relates to compositions, articles and methods of scavenging oxygen in environments containing oxygen-sensitive products, particularly food and beverage products. It has been unexpectedly found that the incorporation of certain derivatives of benzophenone into an oxygen scavenging resin causes short initiation periods for scavenging oxygen and reduced migration of the initiator and its by-products from the resin compositions.

BACKGROUND OF THE INVENTION

The present invention relates to oxygen scavenging compositions, to polymeric compositions containing said oxygen scavenging compositions, and further to intermediate shaped structures, e.g., films, coatings, 3-dimensional solids, fibers, webs, and the like, which contain such polymeric compositions, as well as to shaped products, into or onto, which such compositions or structures are incorporated or applied, respectively, e.g., packaging articles, having the subject compositions incorporated as part of or attached to the article's structure.

It is well known that limiting the exposure of oxygen-sensitive materials to oxygen maintains and enhances the quality and "shelf-life" of the material. For instance, by limiting the oxygen exposure of oxygen sensitive food products in a packaging system incorporating a material or composition capable of scavenging oxygen, the quality of the food product is maintained and food spoilage is avoided for extended periods. In addition, such packaging systems permit keeping the product in inventory longer and, thereby, reduce costs incurred from waste and having to restock. In the food packaging industry, several means for limiting oxygen exposure have already been developed. At present, the most commonly used means are modified atmosphere packaging (MAP), and vacuum packaging coupled with the use of oxygen barrier films. In these instances, reduced oxygen environments are employed at the time of packaging and the oxygen barrier film physically prevents oxygen from entering the packaging environment during storage.

Another, more recent means for limiting oxygen exposure involves incorporating an oxygen scavenger into the packaging structure. The term "oxygen scavenger" or "scavenger", as used in the present specification and appended claims refers to compounds and compositions which are capable of consuming, depleting or reducing the amount of oxygen from a given environment. Incorporation of a scavenger in a package (e.g., as part of a film forming the package, or at least one layer of a laminate forming the package or as a coating on at least a portion of the package structure) can provide a means of scavenging oxygen in the headspace of the package as well as providing uniform scavenging effect throughout the package. In addition, incorporation of a scavenger can provide a means of intercepting and scavenging oxygen as it is passing through the walls of the package (herein referred to as an "active oxygen barrier") to maintain the lowest possible oxygen level throughout the package.

Examples of oxygen scavenger compositions incorporated into an oxygen scavenging wall are illustrated in European Applications 301,719 and 380,319; PCT 90/00578 and 90/00504, and U.S. Pat. Nos. 5,021,515 and 5,049,624. The oxygen scavenger compositions disclosed in these publications comprises a polyamide and a transition metal catalyst. A package wall containing such compositions regulate the amount of oxygen which reaches the interior of the package. However, the onset of useful oxygen scavenging activity, i.e. up to about 5 cubic centimeters (cc) oxygen per square meter per day at ambient conditions, by this wall may not occur for as long as 30 days. The delay before the onset of useful oxygen scavenging is hereinafter referred to as the induction period. Such extended induction period is not generally desired.

Other oxygen scavenger compositions comprising a transition metal catalyst and an ethylenically unsaturated compound, e.g. polybutadiene, polyisoprene, dehydrated castor oil, etc., as described in U.S. Pat. No. 5,346,644, also exhibit lengthy induction periods. For example, when the oxygen scavenger comprises a polybutadiene, the induction period can exceed thirty days. Scavengers comprising polyisoprene or dehydrated castor oil typically have induction periods of about one to fourteen days. The duration of the induction period depends on several factors, some of which are not completely understood or controllable. Accordingly, when using films or articles containing oxygen scavenger compositions having long induction periods, it is required to keep the films and articles in inventory for a period of time prior to use in order to provide reliable scavenging behavior required to protect oxygen sensitive material in a package. On the other hand, when using packages which incorporate films or articles containing scavenger compositions having short induction periods, the package, films and articles, as appropriate, will have to be prepared quickly and put to use in a short time period, sometimes immediately or stored in an oxygen-free atmosphere in order to attain the maximum effectiveness as a scavenger.

One method described to initiate scavenging on demand in packages for oxygen-sensitive foods or other materials involves incorporating photooxidizable rubber, e.g. cis-1,4-polyisoprene, and a photosensitizing dye into the inner surface of a package and then exposing it to visible light. See Rooney, M. L., "Oxygen Scavenging: A Novel Use of Rubber Photo-oxidation", *Chemistry and Industry*, Mar. 20, 1982, pp. 197–198. However, while this method allows one to initiate oxygen scavenging when desired, it requires constant exposure of the package to light to maintain the scavenging effect. Such a requirement is not suitable for commercial application. Further, the required use of a dye makes it difficult to employ this method for applications which require colorless packaging, especially the transparent packaging commonly used commercially with food and beverage products.

A method of initiating oxygen scavenging by compositions which comprise oxidizable organic compounds and transition metal catalysts is disclosed in U.S. Pat. No. 5,211,875, which is incorporated herein by reference as if set forth in full. The reference sets forth a method of initiating oxygen scavenging by administration of a dose of actinic radiation. The oxygen scavenging compositions are conveniently prepared by compounding a scavenging resin(s), transition metal catalyst and, optionally, a photoinitiator. The scavenging is initiated by subjecting the package, film or article containing the scavenging compositions to actinic radiation. However, the oxygen scavenging compositions prepared by this reference exhibit an undesirably high level of migration of the photoinitiator and/or its by-products from the packaging material, particularly when used to package fatty substances.

It is highly desired to provide an improved oxygen scavenging composition suitable for use in packages, films and articles. The composition should provide the ability to have useful oxygen scavenging activity within short induction periods after irradiation. Further, the composition should be capable of retaining the active components and the irradiation by-products within a polymer matrix used as a carrier for the scavenging composition.

SUMMARY OF THE INVENTION

It is an object of the invention to provide novel methods and compositions which are effective in controlling oxygen scavenging properties of a film or other packaging article.

It is also an object of the invention to provide a composition capable of having oxygen scavenging initiated on demand, and exhibit a relatively short induction period.

It is also an object of the present invention to provide a composition capable of retaining the active components and the irradiation by-products within the polymer matrix used as a carrier for the scavenging composition.

It is also an object of the present invention to employ these methods and compositions in films, packages and articles containing oxygen-sensitive products.

The above-mentioned objects are obtained from an oxygen scavenging composition comprising a combination of an oxidizable organic compound, a transition metal catalyst, and certain substituted benzophenones, as fully described herein below. Further, the above-mentioned objects are obtained by a method which employs films of single and multilayered design and articles which contain the subject oxygen scavenging composition, especially those used for packaging oxygen-sensitive products.

The present invention provides improved oxygen scavenging compositions comprising (a) an oxidizable organic compound, (b) a transition metal catalyst, and (c) a photoinitiator which is at least one substituted derivative of benzophenone, as fully described herein below.

When the composition comprising (a), (b) and (c) stated above is used with or in a package or as part of a film, such as at least one layer of a film, novel articles for packaging oxygen-sensitive products can be prepared. When using those articles with the method described herein, the article regulates the oxygen exposure by acting as an active oxygen barrier or means for scavenging oxygen from within the article, or both.

The above-mentioned goals and others will be apparent from the description that follows.

DESCRIPTION OF THE INVENTION

The present invention provides a novel oxygen scavenging composition capable of having oxygen scavenging activity initiated on demand, exhibiting short induction periods, and capable of retaining the active components and its irradiation by-products within the polymer matrix acting as carrier for the scavenging composition.

The composition comprises a combination of at least one (a) an oxidizable organic compound (b) at least one transition metal catalyst, and (c) a photoinitiator composed of at least one substituted benzophenone, as fully described herein below.

The oxidizable compounds include, but are not necessarily limited to, benzylic, allylic and/or tertiary hydrogen containing carbon compounds. Specific compounds include polymers and copolymers of alpha olefins. Examples of such polymers are low density polyethylene, very low density polyethylene, and ultra low density polyethylene; polypropylene; polybutylene, i.e., poly(1-butene); propylene copolymers; ethylene/propylene copolymers ("EPC"); butylene copolymers; hydrogenated diene polymers; and the like.

Suitable oxidizable compounds also include polyamides such as aromatic polyamides, e.g. meta-xylylene adipamide. Other suitable polyamides are disclosed in European Patent Application 301,719, the teachings of which are incorporated herein in its entirety by reference.

It is particularly preferred to use an unsubstituted or a substituted ethylenically unsaturated hydrocarbon compound as the oxidizable compound of this invention. As defined herein, an unsubstituted ethylenically unsaturated hydrocarbon is any compound which possesses at least one aliphatic carbon-carbon double bond and comprises 100% by weight carbon and hydrogen. A substituted ethylenically unsaturated hydrocarbon is defined herein as an ethylenically unsaturated hydrocarbon which possesses at least one aliphatic carbon-carbon double bond and comprises about 50%–99% by weight carbon and hydrogen. Preferable unsubstituted or substituted ethylenically unsaturated hydrocarbons are those having two or more ethylenically unsaturated groups per molecule. More preferably, it is a polymeric compound having three or more ethylenically unsaturated groups and a weight average molecular weight equal to or greater than 1,000.

Preferred substituted ethylenically unsaturated hydrocarbons include, but are not limited to, those with oxygen-containing moieties, such as esters, carboxylic acids, aldehydes, ethers, ketones, alcohols, peroxides, and/or hydroperoxides. Specific examples of such hydrocarbons include, but are not limited to, condensation polymers such as polyesters derived from monomers containing carbon-carbon double bonds; unsaturated fatty acids such as oleic, ricinoleic, dehydrated ricinoleic, and linoleic acids and derivatives thereof, e.g. esters. Such hydrocarbons also include polymers or copolymers derived from (meth)allyl (meth)acrylates. Suitable oxygen scavenging polymers can be made by trans-esterification, as disclosed in WO 95/02616, the teachings of which is incorporated herein by reference as if set forth in full.

The oxygen scavenging composition may also comprise a mixture of two or more oxidizable organic compounds, such as a mixture of substituted or unsubstituted ethylenically unsaturated hydrocarbons described above. While a weight average molecular weight of 1,000 or more is preferred, the ethylenically unsaturated hydrocarbon having a lower molecular weight may be used, provided it is blended with a film-forming polymer or blend of polymers.

It is preferred to utilize ethylenically unsaturated hydrocarbons which are capable of forming solid transparent layers at room temperature when utilizing the composition in packaging articles. For most applications where transparency is necessary, a layer which allows at least 50% transmission of visible light is preferred.

When making transparent oxygen-scavenging layers according to this invention, 1,2-polybutadiene is especially preferred as at least a portion of the oxidizable organic compound (a) for use at room temperature. 1,2-polybutadiene can exhibit transparency, mechanical properties and processing characteristics similar to those of polyethylene. In addition, this polymer is found to retain its transparency and mechanical integrity even after most or all of its oxygen capacity has been consumed, and even when little or no diluent resin (as described below) is present. Even further, 1,2-polybutadiene exhibits a relatively high oxygen capacity and, once it has begun to scavenge, it exhibits a relatively high rate of scavenging as well.

When oxygen scavenging at low temperatures is desired, 1,4-polybutadiene, and copolymers of both styrene with butadiene and styrene with isoprene are preferred. Such compositions are disclosed in U.S. Pat. No. 5,310,497, the teachings of which are incorporated herein by reference as if set forth in full. In many cases it may be desirable to blend the aforementioned polymers with a polymer or copolymer of ethylene.

As indicated above, the oxidizable organic compound(s) is combined with a transition metal catalyst. While not being bound by any particular theory, the inventors observe that suitable metal catalysts are those which can readily interconvert between at least two oxidation states. See Sheldon, R. A.; Kochi, J. K.; "Metal-Catalyzed Oxidations of Organic Compounds" Academic Press, New York 1981.

Preferably, the catalyst is in the form of a transition metal salt, with the metal selected from the first, second or third transition series of the Periodic Table. Suitable metals include, but are not limited to, manganese II or III, iron II or III, cobalt II or III, nickel II or III, copper I or II, rhodium II, III or IV, and ruthenium. The oxidation state of the metal when introduced is not necessarily that of the active form. The metal is preferably iron, nickel or copper, more preferably manganese and most preferably cobalt. Suitable counterions for the metal include, but are not limited to, chloride, acetate, stearate, palmitate, caprylate, linoleate, tallate, 2-ethylhexanoate, neodecanoate, oleate or naphthenate. Particularly preferable salts include cobalt (II) 2-ethylhexanoate and cobalt (II) neodecanoate. The metal salt may also be an ionomer, in which a polymeric counterion is employed. Such ionomers are well known in the art.

The present composition further contains a photoinitiator composed of at least one substituted derivative of benzophenone. The derivatized benzophenones found useful in the present composition can be represented by the following structural formula:

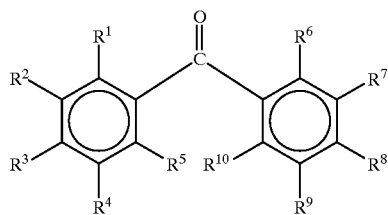

wherein:
i) at least one $R^1$, $R^2$, $R^3$, $R^4$ or $R^5$ is independently selected from $C_2$–$C_{18}$ alkyl, $C_2$–$C_{18}$ alkoxy, a phenoxy, $C_5$–$C_7$ alicyclic hydrocarbon, an alkaryl or a $C_2$–$C_{18}$ ester group, and the remainder of said $R^1$, $R^2$, $R^3$, $R^4$ and $R^5$ are hydrogen atoms; and each $R^6$, $R^7$, $R^8$, $R^9$ and $R^{10}$ is a halogen or hydrogen atom; or ii) at least one $R^1$, $R^2$, $R^3$, $R^4$ or $R^5$ and at least one $R^6$, $R^7$, $R^8$, $R^9$ or $R^{10}$ are each independently selected from a $C_1$–$C_{18}$ alkyl, $C_1$–$C_{18}$ alkoxy, a phenoxy, $C_5$–$C_7$ alicyclic, an alkaryl or a $C_1$–$C_{18}$ ester group and the remainder of said groups are each halogen or hydrogen atoms.

Thus, the subject benzophenone derivatives of the present oxygen scavenging composition must be at least a $C_{15}$ benzophenone derivative requiring having at least one hydrocarbon pendent group capable of fulfilling this requirement pendent from one of the benzylic groups, or preferably, from each of the benzylic groups, of the benzophenone. Each pendent group can be selected from hydrocarbon containing groups selected from those described above. It is preferred to have at least one such group on each benzylic group as provided by subparagraph (ii) above. The alkyl groups suitable are, for example, methyl (for embodiment (ii)), ethyl, propyl, isopropyl, butyl, t-butyl, pentyl, dodecyl, hexadecyl, octadecyl and the like; a $C_1$–$C_{18}$ alkoxy group, as for example methoxy (for embodiment (ii)), ethyoxy, propoxy, butoxy, dodecyloxy and the like; a $C_5$–$C_7$ alicyclic groups, as for example, cyclopentyl cyclohexyl, cycloheptyl and the like; alkaryl having $C_1$–$C_6$ alkyl pendent group such as, for example, toluenyl and the like; or an ester which may be either —C(O)OR$^7$ or —OC(O)R$^7$ wherein R$^7$ is a $C_1$–$C_{18}$ hydrocarbon (for embodiment (ii) above) or $C_2$–$C_{18}$ hydrocarbon. Each of the above hydrocarbon groups may be fully saturated or may contain ethylenic unsaturation within the hydrocarbon chain as, for example, a propyl group may also be viewed as an allyl group, a $C_{18}$ group may be also viewed as stearate or oleate and so forth. The halogen atom substitution, (applicable for embodiment (I)) can be chloride, bromide, or the like.

Derivatives of benzophenone which are suitable for the present improved oxygen scavenging composition include, for example, 4,4'-dimethyl benzophenone, 4,4'-dimethyoxybenzophenone, 2,2'-diethylbenzophenone, 4,4'-diphenoxybenzophenone, 4-allyloxybenzophenone, 4,4'-diallyloxybenzophenone, 4-dodecylbenzophenone, 4,4'-dicyclohexylbenzophenone, 4,4'-diacetylbenzophenone, 4-tolylbenzophenone, and the like. The subject benzophenone derivatives found useful in the present invention must be compatible with the oxidizable organic compound, and exhibit a degree of migration of about 500 ppb or less when subjected to a food simultant under food simulation conditions, as proposed by the U.S. Food and Drug Administration (FDA) or other applicable governmental agency.

The subject oxygen scavenging composition may be further combined with one or more polymeric diluent, such as thermoplastic polymers which are typically used to form film layers in plastic packaging articles. In the manufacture of certain packaging articles well known thermosets can also be used as the polymeric diluent.

Antioxidants may be incorporated into the subject composition as well as films and articles containing the composition of this invention to control scavenging initiation. An antioxidant, as defined herein, is any material which inhibits oxidative degradation or cross-linking of polymers. Typically, such antioxidants are added to facilitate the processing of polymeric materials and/or prolong their useful lifetime. In relation to this invention, such additives inhibit the initiation of the induction period for oxygen scavenging in the absence of irradiation. Then when the layer's or article's scavenging properties are required, the layer or article having the subject composition and incorporated photoinitiator can be exposed to radiation.

When an antioxidant is incorporated into the composition (either directly or via a polymer diluent or the like forming a part of the polymer matrix containing the oxygen scavenging composition), it should be used in an amount effective to permit processing and desired storage life without significant oxidation, while not interfering in activation by irradiation. The exact amount will depend on the particular oxidizable organic compound, the processing conditions, the desired length of storage prior to use and the amount of photoinitiator present in the composition. The exact amount for a particular situation can be readily determined by simple experimentation. Examples of antioxidants suitable for use are, for example, hindered phenolics, such as, 2,6-di(t-butyl) 4-methyl-phenol(BHT), 2,2'-methylene-bis(6-t-butyl-p-cresol); phosphites, such as, triphenylphosphite, tris-(nonylphenyl)phosphite; and thiols, such as, dilaurylthiodipropionate and the like.

The composition of this invention can be used as an oxygen scavenging film or layer, per se, or in combination with film-forming diluent polymers. Such polymers are thermoplastic and render the film more adaptable for use as packaging layers. They also may be, to some extent, oxidizable, and thus factored into the oxygen scavenger formulation as an oxidizable organic compound. Suitable diluents include, but are not limited to, polyethylene, low density polyethylene, very low density polyethylene, ultra-low density polyethylene, high density polyethylene, polyethylene terephthalate (PET), polyvinyl chloride, and ethylene copolymers such as ethylene-vinyl acetate, ethylene-alkyl (meth)acrylates, ethylene-(meth)acrylic acid and ethylene-(meth)acrylic acid ionomers. In rigid articles such as beverage containers PET is often used. Blends of different diluents may also be used. However, the selection of the polymeric diluent largely depends on the article to be manufactured and the end use thereof. Such selection factors are well known in the art. For instance, the clarity, cleanliness, effectiveness as an oxygen scavenger, barrier properties, mechanical properties and/or texture of the article can be adversely affected by a blend containing a diluent polymer which is incompatible with the oxidizable organic compound.

Other additives which may also be included in oxygen scavenger layers include, but are not necessarily limited to, fillers, pigments, dyestuffs, stabilizers, processing aids, plasticizers, fire retardants, anti-fog agents, and the like.

The subject oxygen scavenging composition has been found to be substantially non-migratory in the film or packaging article during normal use. Thus, the presently used photoinitiator component and the by-products formed after subjecting the composition to irradiation to initiate oxidation have been unexpectedly found to remain within the oxygen scavenging composition or layer containing same. Thus, a film having a plurality of layers, one of which is an oxygen scavenging layer, does not show significant migration of the photoinitiator from the oxygen scavenging layer to the other layers of the film. The resultant film can, thereby, be stored prior to subjection to irradiation and use as a packaging material without loss of potential activity associated to the initiator. Further, the subject compositions have been found to be readily activated by subjection to ultraviolet radiation and to provide oxygen scavenging properties without having the residual initiator or the by-products formed within the oxygen scavenging layer migrate into the food material, especially fatty material, during normal use.

To prepare oxygen scavenging layers and articles, the desired components thereof are preferably melt-blended at a temperature in the range of 50° C. to 300° C. However, alternatives, such as the use of a solvent followed by evaporation, may also be employed. The blending may immediately precede the formation of the finished article or preform or precede the formation of a feedstock or masterbatch for later use in the production of finished packaging articles. When the blended composition is used to make film layers or articles, (co)extrusion, solvent casting, injection molding, stretch blow molding, orientation, thermoforming, extrusion coating, coating and curing, lamination, extrusion lamination or combinations thereof would typically follow the blending.

The amounts of the components which are used in the oxygen scavenging compositions, or layers have an effect on the use, effectiveness and results of this method. Thus, the amounts of oxidizable organic compound, transition metal catalyst and photoinitiator, as well as any antioxidant, polymeric diluents or additives, can vary depending on the article and its end use.

For instance, the primary function of an oxidizable organic compound of the oxygen scavenger composition is to react irreversibly with oxygen during the scavenging process, while the primary function of the transition metal catalyst is to facilitate this process. Thus, to a large extent, the amount of oxidizable organic compound will affect the oxygen capacity of the composition, i.e., affect the amount of oxygen that the composition can consume. The amount of transition metal catalyst will affect the rate at which oxygen is consumed. Because it primarily affects the scavenging rate, the amount of transition metal catalyst may also affect the induction period.

The amount of oxidizable organic compound may range from 1 to 99%, preferably from 10 to 99%, by weight of the film, layer or article containing the oxygen scavenging composition of the present invention. For example, in a coextruded film, the scavenging layer would comprise the particular layer(s) in which both oxidizable organic compound, transition metal catalyst and photoinitiator are present together. A film, layer, or article containing said composition is herein after referred to as a scavenging component.

The amount of transition metal catalyst may range from 0.001 to 1% (10 to 10,000 ppm) of the scavenging component, based on the metal content only (excluding ligands, counterions, etc.). In the event the amount of transition metal catalyst is less than 1%, it follows that the oxidizable organic compound, and benzophenone derivative as well as any diluent and/or other additives, will comprise substantially all of the scavenging component, i.e. more than 99% as indicated above for the oxidizable organic compound.

The subject benzophenone derivatives act as a photoinitiator which has a primary function of enhancing and facilitating the initiation of oxygen scavenging upon exposure to radiation. The amount of photoinitiator can vary. In many instances, the amount will depend on the oxidizable compounds used, the wavelength and intensity of radiation used, the nature and amount of antioxidants used, as well as the particular photoinitiator used. The amount of photoinitiator also depends on how the scavenging component is used. For instance, if the photoinitiator-containing component is placed underneath a layer which is somewhat opaque to the radiation used, more initiator may be needed. For most purposes, however, the amount of photoinitiator will be in the range of 0.01 to 10%, more preferably in the range of 0.1 to 1%, by weight of the total composition. The exact amount required can be readily determined by the artisan and should be sufficient to provide an induction period of less than five days, preferably less than three days and most preferably less than one day.

The total amount of antioxidant which may be present in the composition may affect the results achieved. As mentioned earlier, such antioxident materials are usually present in oxidizable organic compounds or diluent polymers to prevent oxidation and/or gelation of the polymers prior to the induction period. Typically, they are present in about 0.01 to 1% by weight. However, additional amounts of antioxidant may also be added if it is desired to tailor the induction period as described above.

When one or more diluent polymers are used, those polymers can comprise, in total, as much as 99% by weight of the scavenging component.

Any further additives employed normally will not comprise more than 10% of the scavenging component, with preferable amounts being less than 5% by weight of the scavenging component.

The method of this invention can be used with packaging articles used in a variety of fields. Packaging articles typically come in several forms including rigid containers, flexible bags, combinations of both, etc. Typical rigid or semi-rigid articles include plastic, paper of cardboard cartons or bottles such as juice containers, soft drink containers, thermoformed trays or cups which have wall thicknesses in the range of 100 to 1000 micrometers. Typical flexible bags include those used to package many food items, and will likely have thicknesses of 5 to 250 micrometers. The walls of such articles either comprise single or multiple layers of material.

The scavenging component of the present invention can be used as a single scavenging layer or a scavenging layer as part of a multilayer article such as those described in. U.S. Pat. No. 5,350,622, which teaching is incorporated herein by reference, as if setforth in full. Single layered articles can be prepared by solvent casting or by extrusion. Multilayered articles are typically prepared using coextrusion, coating, lamination or extrusion lamination. The additional layers of a multilayered article may include "oxygen barrier" layers, i.e. those layers of material having an oxygen transmission rate equal to or less than 500 cubic centimeters per square meter per day per atmosphere $(cc/(m^2 \cdot d \cdot atm))$ at room temperature, i.e. about 25° C. Typical oxygen barriers comprise poly(ethylene vinylalcohol), poly(vinylalcohol), polyacrylonitrile, polyvinyl chloride, poly(vinylidene dichloride), polyethylene terephthalate, silica, and polyamides such as Nylon 6, MXD6, and Nylon 6,6. Copolymers of certain materials described above, and metal foil layers, can also be employed.

Other additional layers may include one or more layers which are permeable to oxygen. In one preferred packaging construction, especially for flexible packaging for food, the layers include, in order starting from the outside of the package to the innermost layer (that exposed to the cavity within a formed package suitable for containing a packaged material) of the package, (i) an oxygen barrier layer, (ii) a scavenging layer, i.e. the scavenging component as defined earlier, and optionally, (iii) an oxygen permeable layer. Control of the oxygen barrier property of (i) allows a means to regulate the scavenging life of the package by limiting the rate of oxygen entry to the scavenging component (ii), and thus limiting the rate of consumption of scavenging capacity. Control of the oxygen permeability of layer (iii) allows a means to set an upper limit on the rate of oxygen scavenging for the overall structure independent of the composition of the scavenging component (ii). This can serve the purpose of extending the handling lifetime of the films in the presence of air prior to sealing of the package. Furthermore, layer (iii) can provide a barrier to migration of the individual components in the scavenging films or by-products of scavenging into the package interior. Even further, layer (iii) also improves the heat-sealability, clarity and/or resistance to blocking (the tendency of film to cling to itself, especially during storage and handling) of the multilayer film. Thus, layer (ii) can be either directly or indirectly exposed to the cavity of the formed package.

Further additional layers such as adhesive layers may also be used. Compositions typically used for adhesive layers include anhydride functionalized polyolefins and other well-known adhesive layers.

Once the components have been chosen and formulated for the desired scavenging composition, layer or article, the method of this invention employs exposing the composition, layer or article to radiation in order to initiate oxygen scavenging. The initiation of oxygen scavenging of an oxygen scavenger composition is defined herein as facilitating scavenging such that the induction period of oxygen scavenging is significantly reduced or eliminated. As indicated above, the induction period is the period of time before the scavenging composition exhibits useful scavenging properties.

The radiation used in this method should be ultraviolet light having a wavelength of from about 200 to 450 nanometers (nm) and preferably has a wavelength of about 200 to 400 nm. It is preferred to use UV radiation in the UVA, UVB or UVC ranges. As used herein, UVA means radiation having a wavelength of about 315–400 nm; UVB has a range of about 280–315 nm, and UVC has a range of about 200–280 nm. When employing this method, it is preferable to expose the oxygen scavenger composition to at least 0.1 Joules per gram of scavenging component. A typical amount of exposure is in the range of 10 to 200 Joules per gram. The radiation can also be an electron beam at a dosage of about 0.2 to 20 megarads, preferably about 1 to 10 megarads. Other sources of radiation include ionizing radiation, such as gamma, x-rays or corona discharge. The radiation exposure is preferably conducted in the presence of oxygen. The duration of exposure depends on several factors including, but not limited to, the amount and specific photoinitiator compound present, thickness of the layers to be exposed, amount of any antioxidant present, and the wavelength and intensity of the radiation source.

When using oxygen scavenging layers or articles, the exposure to radiation can be during or after the layer or article is prepared. If the resulting layer or article is to be used to package an oxygen sensitive product, exposure can be just prior to, during, or after packaging. However, in any event, radiation exposure is required prior to using the layer or article as an oxygen scavenger. For best uniformity of radiation, the exposure should be conducted at a processing stage where the layer or article is in the form of a flat sheet.

In order to use the method of this invention in the most efficient manner, it is preferable to determine the oxygen scavenging capabilities, e.g. rate and capacity, of the oxygen scavenger. To determine the rate of oxygen scavenging, the time elapsed before the scavenger depletes a certain amount of oxygen from a sealed container can be readily measured. In some instances the scavenger's rate can be adequately determined by placing a film comprising the desired scavenger in an air-tight, sealed container of a certain oxygen containing atmosphere, e.g. air which typically contains 20.6% oxygen by volume. Then, over a period of time, samples of the atmosphere inside the container are removed to determine the percentage of oxygen remaining. Usually, the specific rates obtained will vary under different temperature and atmospheric conditions. Unless otherwise noted, the rates indicated in the Examples are at room temperature and one atmosphere of air.

When an active oxygen barrier is needed, a useful scavenging rate can be as low as 0.05 cc oxygen ($O_2$) per gram of oxidizable organic compound in the scavenging component per day in air at 25° C. and at 1 atmosphere pressure. However, certain compositions, e.g. those containing the ethylenically unsaturated oxidizable organic compounds, have the capability of rates equal to or greater than 0.5 cc oxygen per gram per day, thus making such compositions suitable for scavenging oxygen from within a package, as well as suitable for active oxygen barrier applications. The scavengers comprising ethylenically unsaturated hydrocarbons are capable of more preferable rates equal to or greater than 5.0 cc $O_2$ per gram per day.

Oxygen scavenging films initiated in accordance with the present invention exhibit oxygen scavenging rates, depending upon the formulation and type of package to which the film is applied, of between about 1 cc/m²/day to about 100 cc/m²/day at temperatures of about 4° C. when measured 4 days after triggering. For modified atmosphere packages (MAP) having a modified atmosphere headspace, (MAP, 1–2% $O_2$), oxygen scavenging film triggered as set forth above exhibits an oxygen scavenging rate of between about 20 cc/m²day to about 66 cc/m²/day at about 4° C. when measured 4 days after initiation, thereby advantageously removing oxygen from the head space of such a package so as to reduce or eliminate adverse effects upon the product or article packaged therein.

When it is desired to use this method with an active oxygen barrier application, the initiated oxygen scavenging activity, in combination with any oxygen barriers, should create an overall oxygen transmission rate of less than about 1.0 cubic centimeters per square meter per day per atmosphere at 25° C. The oxygen scavenging capacity should be such that this transmission rate is not exceeded for at least two days. For many commercial applications, it is expected that the scavenging rates be able to establish an internal oxygen level of less than 0.1% in as soon as possible, preferably less than about four weeks' time.

Once scavenging has been initiated, the scavenger, layer or article prepared therefrom, should be able to scavenge up to its capacity, i.e. the amount of oxygen which the scavenger is capable of consuming before it becomes ineffective. In actual use, the capacity required for a given application depends on:

(1) the quantity of oxygen initially present in the package,
(2) the rate of oxygen entry into the package in the absence of the scavenging property,
(3) the amount of oxygen which might be generated or absorbed by the package contents, and
(4) the intended shelf life for the package.

When using scavengers comprising ethylenically unsaturated compounds, the capacity can be as low as 1 cc oxygen per gram, but can be at least 50 cc oxygen per gram. When such scavengers are in a layer, the layer will preferably have an oxygen capacity of at least 250 cc oxygen per square meter per mil thickness and more preferably at least 1200 cc oxygen per square meter per mil thickness.

As stated above, the present oxygen scavenging composition has unexpectedly been found to be readily activated by subjection to ultraviolet radiation, provide good oxygen scavenging properties and to do the above without having residual initiator or by-products migrate into the food material, especially fatty foods, during normal use.

For the purposes of this application, substantially non-migratory means that no more than about 500 parts per billion (ppb), preferably no more than about 100 ppb, and even more preferably no more than 50 ppb, initiator is extracted by a food simulant from the article under food simulation conditions. The U.S. Food and Drug Administration has developed test procedures for determining the ability of a substance to migrate into various food substances.

A migration test is an analysis to detect the presence of one material mixed in another. The test results are properly reported as some non-zero number. Where no migrating material has been found, the results are properly reported as "not more than" or "less than" the least amount of material that the test can reliably detect (the threshold level of detection). Amounts in the low parts per billion (ppb) range are generally recognized as insignificant in most instances. Although some products, such as purified oils, may be readily analyzed for migratory materials, many other products present substantial practical problems. For that reason, a food-simulating solvent can be used to help establish the nature and amount of migration of a material from an article into a product.

The food simulant for a fatty food may be a liquid food oil or 95% ethanol in water. The liquid food oil may be a natural product, such as olive oil or corn oil, a derivative of a natural oil, such as a fractionated coconut oil composed of saturated (30–70%) $C_8$ and (30–50%) $C_{10}$ triglycerides commercially available as Miglyol 812™, or a mixture of synthetic triglycerides, primarily $C_{10}$, $C_{12}$, and $C_{14}$ (commercially available as HB307). For low-and high-alcoholic foods, the food simulant is 10% or 50% solution of ethanol in water. For aqueous and acidic foods, the typical solvent is 10% solution of ethanol in water, although water and acetic acid may also be used.

Because a product may contact many foods with different processing conditions and shelf lives, testing is done under the most sever temperature and time conditions to which a food-contact article containing the material of interest will be exposed. For high temperature, heat sterilized or retorted packaging processes, the package is heated to 121° C. (250° F.) for two hours followed by holding at 40° C. (104° F.) for 238 hours, and analyzed periodically for a total holding time of 10 days.

The same testing protocol is used for boiling water sterilized processes, except that the highest temperature is 100° C. (212° F.). For hot-filled processes, food simulants are added to test samples at 100° C. (212° F.), held for 30 minutes, and then allowed to cool to 40° C. (104° F.). For room temperature applications, a test temperature of 40° C. (120° F.) for 10 days has been recommended, and for refrigerated or frozen food applications, the test temperature is 20° C. (68° F.).

Results are reported in terms of milligrams of substance extracted per square inch (mg/in²) of surface area, for ease of conversion to concentration in food. If ten grams of food are in contact with one square inch of packaging surface, migration of 0.01 mg/in² corresponds to a concentration in food of 1 ppm.

In order to determine the accuracy and precision of a given test method, migration test solutions (not pure solvents) are spiked with the material of interest at known levels to serve as controls. Generally, the spiked solutions contain about ½, 1 and 2 times the analyzed concentration of the material of interest. Unless otherwise noted, control samples are polymer films or placques formulated without the material of interest.

The following examples illustrate the practice of the present invention without limiting its scope or the scope of the claims which are appended hereto. All parts and percentages indicated in the examples are by weight, unless indicated otherwise.

EXAMPLE 1

Photoinitiators were screened for their ability to initiate oxygen absorption and cause oxygen scavenging by melt blending scavenging resin composed of 1,2-poly(butadiene) (RB830 available from Japan Synthetic Rubber) with sufficient cobalt neodecanoate (Ten-Cem® available from OMG, Inc.) to give 350 ppm dosage of cobalt metal, and 0.5% by weight of a photoinitiator under study in a Brabender batch mixture. Each formulation was then pressed into films (usually 10–25 mils thick). The films were then cut into squares (200 cm²) and exposed to UV irradiation which were then sealed in oxygen barrier bags and inflated with 300 cc of air and retained at 25° C. Portions of the headspace gas were periodically withdrawn and analyzed for oxygen with a Mocon LC 700° F. oxygen analyzer. Table 1 provides results of films irradiated with a Fusion Systems lamp equipped with an H bulb, at a dose of 0.25 to 0.5 J/cm$^2$ measured at 365 nm. Table 2 provides results of films irradiated with an Amergraph® UV unit (low intensity UVA) at a dosage of about 1 J/cm$^2$ measured at 365 nm. The average rate is calculated by considering only the end points, with the following formula: Average Rate=cc $O_2$ scavenged/ ($m^2$·day), and in this example was calculated after 30 days. The peak instantaneous rate is the highest scavenging rate observed during any sampling period and is calculated by the change in volume (cc) of oxygen scavenged per $m^2$ over incremental time (days) change.

The results of Table 1 and 2 below show that each of the derivatives of benzophenone including those of the instant invention provide short induction periods and good average rates of oxygen scavenging. Further, the samples which illustrate the present invention provide superior peak oxygen scavenging rates to those formed with comparative initiators (c).

TABLE 1

Summary of Photoinitiators
Fusion H-bulb Triggering

| Photoinitiator | Induction Period (days) | Average Rate (cc $O_2$/$m^2$·day) | Peak Ins. Rate (cc $O_2$/$m^2$·day) |
| --- | --- | --- | --- |
| 4-allyloxybenzophenone | <3 | 174 | 343(4) |
| 4,4'-diallyloxybenzophenone | >1 <4 | 102 | 195(4) |
| 4-dodecyloxybenzophenone | >1 <4 | 106 | 134(11) |
| 4,4'-diphenoxybenzophenone | >1 <5 | 132 | 225(15) |
| 4-benzoylbiphenyl (4-phenylbenzophenone) (c) | >1 <2 | 133 | 184(13) |
| Benzophenone (c) | <3 | 90 | 200 |
| 2-methoxybenzophenone (c) | <1 | 137 | 210(16) |
| 4-methoxybenzophenone (c) | >1 <3 | 115 | 160(2) |

TABLE 2

Summary of Photoinitiators
UVA Triggering

| Photoinitiator | Induction Period (days) | Average Rate (cc $O_2$/ $m^2$·day) | Peak Ins. Rate (cc $O_2$/ $m^2$·day) |
| --- | --- | --- | --- |
| Benzophenone (c) | <1 | 171 | 874(2) |
| 4-allyloxybenzophenone | <1 | 137 | 369(5) |
| 4-4'-diallyloxybenzophenone | <1 | 147 | 1,155(1) |
| 4,4'-diphenoxybenzophenone | >1 <5 | 141 | 323(12) |
| Benzophenone (c) | <1 | 171 | 874(2) |
| 4,4'-bis(benzoyl)diphenylether (c) | >1 <5 | 163 | 348(8) |

EXAMPLE 2

Several photoinitiators were evaluated for oxygen scavenging at low temperature conditions by forming compositions having initiators at a constant loading of 0.5% by weight which were compounded into a blend of polyethylene and polybutadiene consisting of 60% by weight low density polyethylene (LDPE) (PE1017 resin available from Chevron Chemical Company, Houston, Tex.) and 40% 1,4-polybutadiene (Taktene 1202 available from Bayer) along with 680 ppm cobalt neodecanoate (Ten-Cem® from OMG, Inc., Cleveland, Ohio). The blends were used as the oxygen scavenging layer ("OSL") in film structures having linear low density polyethylene (LLDPE) outer layers. Three-layer films were made comprising LLDPE/OSL/LLDPE on a Randcastle micro-extrusion unit, and films were triggered with a 1-minute dose of UVC from UVC lamps (Anderson-Vreeland, Bryan, Ohio). Samples were tested in the same manner as described in Example 1, except that air was replaced with 1% oxygen in nitrogen and samples were stored under refrigerated conditions (4° C.). The results are shown in Table 3 below.

TABLE 3

Survey of Photoinitiators
1 Minute UVC, Refrigerated, MAP
Randcastle 3-layer Films: LLDPE/OSL/LLDPE (target 1/1/1 mil)

| Sample | Photoinitiator (0.5% by wt. in OSL) | Induction Period | Ave. Rate a (cc $O_2$/ $m^2$·d) | Ins. Rate (cc $O_2$/ $m^2$·d) |
| --- | --- | --- | --- | --- |
| A | 4-allyloxybenzophenone | <1 | 35 | 55(1) |
| B | 4,4'-diallyoxybenzophenone | <1 | 27 | 50(1) |
| C | 4-dodecyloxybenzophenone | <1 | 36 | 63(2) |
| D | 4,4'-diphenoxybenzophenone | <1 | 34 | 61(1) |
| E | benzophenone (c) | <1 | 23 | 19(2) |
| F | 4,4'-bis(benzoyl)-diphenylether (c) | <1 | 13 | 22(1) | a. Average rate calculated after 3 days.

The above results show that under low temperature application each sample A, B, C and D exhibited higher rates of oxygen absorption and peak absorption rates than provided by the comparative samples E and F formed with non-derivatized benzophenone and diphenyl ether, respectively.

Each of the films made above were tested for migration of the photoinititator and/or by-product material using an approved FDA procedure. Each sample was subjected to an FDA approved food simulant composed of a mixture of caprylic and capric triglycerides (MiglyolTm 812 of Huls America, Piscataway, N.J.) to provide 10 g of simulant per square inch of film surface. The extraction was conducted at room temperature (25° C.) for 10 days. The simulant was then analyzed by high performance liquid chromatography for the presence of photoinitiator and/or by-product.

The results, shown in Table 4 below, show that only very low amounts of derivitized benzophenone photoinitiators migrate while each of the comparative photoinitators (included herein was a sample having 4-benzoylbiphenyl: Sample G) show undesirable high levels of migration.

TABLE 4

Migration Test Results for Benzophenone Derivatives

| Sample | Photoinitiator | Migration[b] ppb |
| --- | --- | --- |
| A | 4-allyloxybenzophenone[a] | <16 |
| B | 4,4'-diallyloxybenzophenone | <47 |
| C | 4-dodecyloxybenzophenone[a] | <47 |
| D | 4,4'-diphenoxybenzo-phenone | <47 |
| E | Benzophenone (c) | 150 |
| F | 4,4'-bis(benzoyl)diphenyl ether (c) | 1,125 |
| G | 4-benzoylbiphenyl (c) | 1,015 |

[a]4-Hydroxybenzophenone, a possible degradation by-product of these photoinitiators, was not detected.
[b]Assuming 10 g of food simulant per square inch of film surface.
(c) comparative

EXAMPLE 3

Three layers blown films consisting of poly(ethylene-vinyl acetate) (EVA), an Oxygen Scavenging Layer (OSL)

and Linear Low Density Poly(ethylene) (LLDPE) were prepared. The OSL was formed with 10% of a masterbatch indicated below and 90% diluent composed of 60% low density polyethylene and 40% 1,4-polybutadiene. In each case the materials were blended together using a twin screw extruder. Each masterbatch contained 1% of photoinitiator and 6,800 ppm cobalt as neodecanoate.

The film samples were irradiated with UVC light (254 nm) for one minute and were tested using the standard refrigerated Modified Atmosphere (MAP) Headspace Scavenging Test (HST). Each film was tested in triplicate and the Average and peak Instantaneous Rates are presented in Table 5 below as the means of three replicates. The number in parenthesis after the mean peak Instantaneous Rate is the number of days after triggering required to reach that rate.

Film samples which were subjected to oxygen atmosphere for 12 days using the standard refrigerated Headspace Scavenging Test were cut into (circular) test specimens, placed over the opening of individual aluminum test cells, and exposed to corn oil (FDA-approved fatty food simulant) for 10 days at room temperature. Each film was tested in triplicate. An aliquot of the corn oil that had been in contact with each film was then collected and analyzed by reverse-phase High Pressure Liquid Chromatography (HPLC) for the presence of photoinitiator. A sample of the virgin corn oil was similarly analyzed as a negative control and, as expected, showed no evidence for the compounds being determined.

The results of both the induction scavenging up-take and migration tests are given in Table 5 below.

TABLE 5

| Sample | Masterbatch (10% in OSL) | Induction Period (days) | Ave. Rate (cc O$_2$/ m$^2$·d) | Ins. Rate (cc O$_2$/ m$^2$·d) | Average Migration (10 g corn oil/ in$^2$ film) ppb |
|---|---|---|---|---|---|
| A | (4,4'-dimethyl-benzophenone) | <1 | 24 | 73(1) | <25 |
| B | (4,4'-dimethoxy-benzophenone) | <1 | 34 | 64(1) | <36 |
| C | Benzophenone | <1 | 33 | 78(1) | 625 |

The above results show that the derivatized benzophenones of the present invention provide short induction periods, good rates of oxygen scavenging while not exhibiting undesired migration properties. When subjected to a food simulant for fatty foods (worst case scenario). In comparison, unsubstituted benzophenone exhibited undesirable high levels of migration.

What is claimed:

1. A composition suitable for scavenging oxygen while inhibiting migration of its components comprising an oxidizable organic compound, a transition metal catalyst, and a photoinitiator selected from benzophenones represented by the formula:

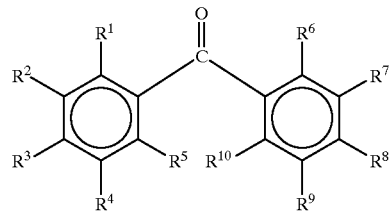

wherein:
i) at least one $R^1$, $R^2$, $R^3$, $R^4$ or $R^5$ is independently selected from a $C_2$–$C_{18}$ alkyl, a $C_5$–$C_{18}$ alkoxy, a phenoxy, a $C_5$–$C_7$ alicyclic hydrocarbon, an alkaryl, or a $C_1$–$C_{18}$ ester group, and the remainder of said $R^1$, $R^2$, $R^3$, $R^4$ and $R^5$ are hydrogen atoms; and each $R^6$, $R^7$, $R^8$, $R^9$ and $R^{10}$ is a halogen or hydrogen atom; or
ii) at least one $R^1$, $R^2$, $R^3$, $R^4$ or $R^5$ and at least one $R^6$, $R^7$, $R^8$, $R^9$ or $R^{10}$ are each independently selected from a $C_1$–$C_{18}$ alkyl, a $C_1$–$C_{18}$ alkoxy, a phenoxy, a $C_5$–$C_7$ alicyclic hydrocarbon, an alkaryl, or a $C_1$–$C_{18}$ ester group, and the remainder of said groups are each halogen or hydrogen atoms;

said photoinitiator being substantially non-migratory from the composition when exposed to a food simulant.

2. The composition of claim 1 wherein the photoinitiator has at least one group selected from a $C_2$–$C_{18}$ alkyl or a $C_2$–$C_{18}$ alkoxy group pendent from at least one $R^1$, $R^2$, $R^3$, $R^4$ or $R^5$.

3. The composition of claim 1 wherein the photoinitiator has at least one group independently selected from a $C_1$–$C_{18}$ alkyl, a $C_1$–$C_{18}$ alkoxy, or a phenoxy group pendent from at least one $R^1$, $R^2$, $R^3$, $R^4$ or $R^5$ and at least one $R^6$, $R^7$, $R^8$, $R^9$ or $R^{10}$.

4. The composition of claim 1 wherein the photoinitiator is selected from 4-alkoxybenzophenone, 4,4'-diallyloxybenzophenone, 4-dodecylbenzophenone, or 4,4'-diphenoxybenzophenone.

5. The composition of claim 1 wherein the oxidizable organic compound is selected from a substituted or unsubstituted hydrocarbon.

6. The composition of claim 1 wherein the oxidizable organic compound has ethylenic unsaturation.

7. The composition of claim 1 wherein the composition comprises between 1 and 99 percent by weight oxidizable organic compound, between 0.001 and 1 percent by weight transition metal catalyst, and between 0.01 and 10 percent by weight photoinitiator, based on the weight of the composition.

8. The composition of claim 7 wherein the composition comprises at least one additive selected from the group consisting of polymeric diluents, fillers, pigments, dyestuff, antioxidants, processing aids, plasticizers, fire retardants, and antifog agents.

9. The composition of claim 1 wherein the composition is capable of exhibiting not more than 500 ppb migration of said photoinitiator into a food simulant.

10. A composition suitable for scavenging oxygen while inhibiting migration of its components comprising an oxidizable organic compound, a transition metal catalyst, and a photoinitiator selected from benzophenones represented by the formula:

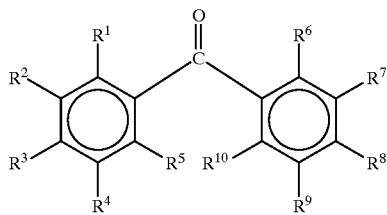

wherein:
i) at least one $R^1$, $R^2$, $R^3$, $R^4$ or $R^5$ is independently selected from a $C_2$–$C_{18}$ alkyl, a $C_2$–$C_{18}$ alkoxy, a phenoxy, a $C_5$–$C_7$ alicyclic hydrocarbon, an alkaryl, or a $C_1$–$C_{18}$ ester group, and the remainder of said $R^1$, $R^2$, $R^3$, $R^4$ and $R^5$ are hydrogen atoms; and
ii) at least one $R^6$, $R^7$, $R^8$, $R^9$ or $R^{10}$ are each independently selected from a $C_1$–$C_{18}$ alkyl, a $C_1$–$C_{18}$ alkoxy, a phenoxy, a $C_5$–$C_7$ alicyclic hydrocarbon, an alkaryl, or a $C_1$–$C_{18}$ ester group, and the remainder of said groups are each halogen or hydrogen atoms;

said photoinitiator being substantially non-migratory from the composition when exposed to a food simulant.

11. The composition of claim 10 wherein the photoinitiator has at least one group selected from a $C_2$–$C_{18}$ alkyl or a $C_2$–$C_{18}$ alkoxy group pendent from at least one $R^1$, $R^2$, $R^3$, $R^4$ or $R^5$.

12. The composition of claim 10 wherein the photoinitiator has at least one group independently selected from a $C_1$–$C_{18}$ alkyl, a $C_1$–$C_{18}$ alkoxy, or a phenoxy group pendent from at least one $R^1$, $R^2$, $R^3$, $R^4$ or $R^5$ and at least one $R^6$, $R^7$, $R^8$, $R^9$ or $R^{10}$.

13. The composition of claim 10 wherein the photoinitiator is selected from 4-alkoxybenzophenone, 4,4'-diallyloxybenzophenone, 4-dodecylbenzophenone, or 4,4'-diphenoxybenzophenone.

14. The composition of claim 10 wherein the oxidizable organic compound is selected from a substituted or unsubstituted hydrocarbon.

15. The composition of claim 10 wherein the oxidizable organic compound has ethylenic unsaturation.

16. The composition of claim 10 wherein the composition comprises between 1 and 99 percent by weight oxidizable organic compound, between 0.001 and 1 percent by weight transition metal catalyst, and between 0.01 and 10 percent by weight photoinitiator, based on the weight of the composition.

17. The composition of claim 16 wherein the composition comprises at least one additive selected from the group consisting of polymeric diluents, fillers, pigments, dyestuff, antioxidants, processing aids, plasticizers, fire retardants, and antifog agents.

18. The composition of claim 10 wherein the composition is capable of exhibiting not more than 500 ppb migration of said photoinitiator into a food simulant.

* * * * *